US012634697B2

(12) United States Patent
Aguirre et al.

(10) Patent No.: US 12,634,697 B2
(45) Date of Patent: May 19, 2026

(54) PRIVATE NETWORK MANAGEMENT VIA DYNAMICALLY DETERMINED RADIO PROFILES

(71) Applicant: VERIZON PATENT AND LICENSING INC., Basking Ridge, NJ (US)

(72) Inventors: Sergio Aguirre, Southlake, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 551 days.

(21) Appl. No.: 18/331,874

(22) Filed: Jun. 8, 2023

(65) Prior Publication Data

US 2024/0414539 A1     Dec. 12, 2024

(51) Int. Cl.
| | |
|---|---|
| *H04W 12/086* | (2021.01) |
| *H04W 12/088* | (2021.01) |
| *H04W 12/63* | (2021.01) |
| *H04W 12/79* | (2021.01) |
| *H04W 16/16* | (2009.01) |
| *H04W 72/0453* | (2023.01) |
| *H04W 72/542* | (2023.01) |
| *H04W 84/06* | (2009.01) |
| *H04W 84/10* | (2009.01) |
| *H04W 88/18* | (2009.01) |
| *H04W 16/14* | (2009.01) |
| *H04W 84/04* | (2009.01) |

(52) U.S. Cl.
CPC ....... *H04W 12/086* (2021.01); *H04W 12/088* (2021.01); *H04W 12/63* (2021.01); *H04W 12/79* (2021.01); *H04W 16/16* (2013.01); *H04W 72/0453* (2013.01); *H04W 72/542* (2023.01); *H04W 84/06* (2013.01); *H04W 84/105* (2013.01); *H04W 88/18* (2013.01); *H04W 16/14* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 2021/0227405 A1* | 7/2021 | Mishra | .................. | H04W 24/02 |
| 2021/0384967 A1* | 12/2021 | Durvasula | ........... | H04W 84/045 |
| 2023/0413189 A1* | 12/2023 | Wang | ................ | H04W 72/0453 |
| 2023/0421253 A1* | 12/2023 | Palermo | ............ | H04B 7/18591 |
| 2024/0098615 A1* | 3/2024 | Anantharaman | ..... | H04W 40/10 |
| 2024/0365213 A1* | 10/2024 | Desai | .................... | H04W 48/16 |

* cited by examiner

*Primary Examiner* — San Htun

(57) ABSTRACT

In some implementations, the techniques described herein relate to a system including: a group of one or more base stations; a radio controller communicatively coupled to the group of base stations and configured to self-identify a current location and identify permissible wireless frequencies based on the current location; a channel manager communicatively coupled to the radio controller configured to scan the permissible wireless channels, identify a subset of the permissible wireless channels within the permissible wireless frequencies, select a radio profile based on the subset of the permissible wireless channels, and transmit the radio profile to the base station; and a gateway communicatively coupled to the base station, the gateway configured to receive and transmit data from a satellite via wireless backhaul.

20 Claims, 6 Drawing Sheets

PRIVATE NETWORK MANAGEMENT VIA DYNAMICALLY DETERMINED RADIO PROFILES

BACKGROUND

Current private networks generally include a fixed fiber backhaul coupled to a private radio access network (RAN). Such networks provide mobile connectivity with reliance on licensed radio spectrum or shared spectrum. Private networks can be dedicated to a customer (for example venue, corporate offices, industrial facility, etc.,) or they can connect too to a mobile network operator (MNO) via high-speed fiber backhaul.

DETAILED DESCRIPTION

Figure 1:
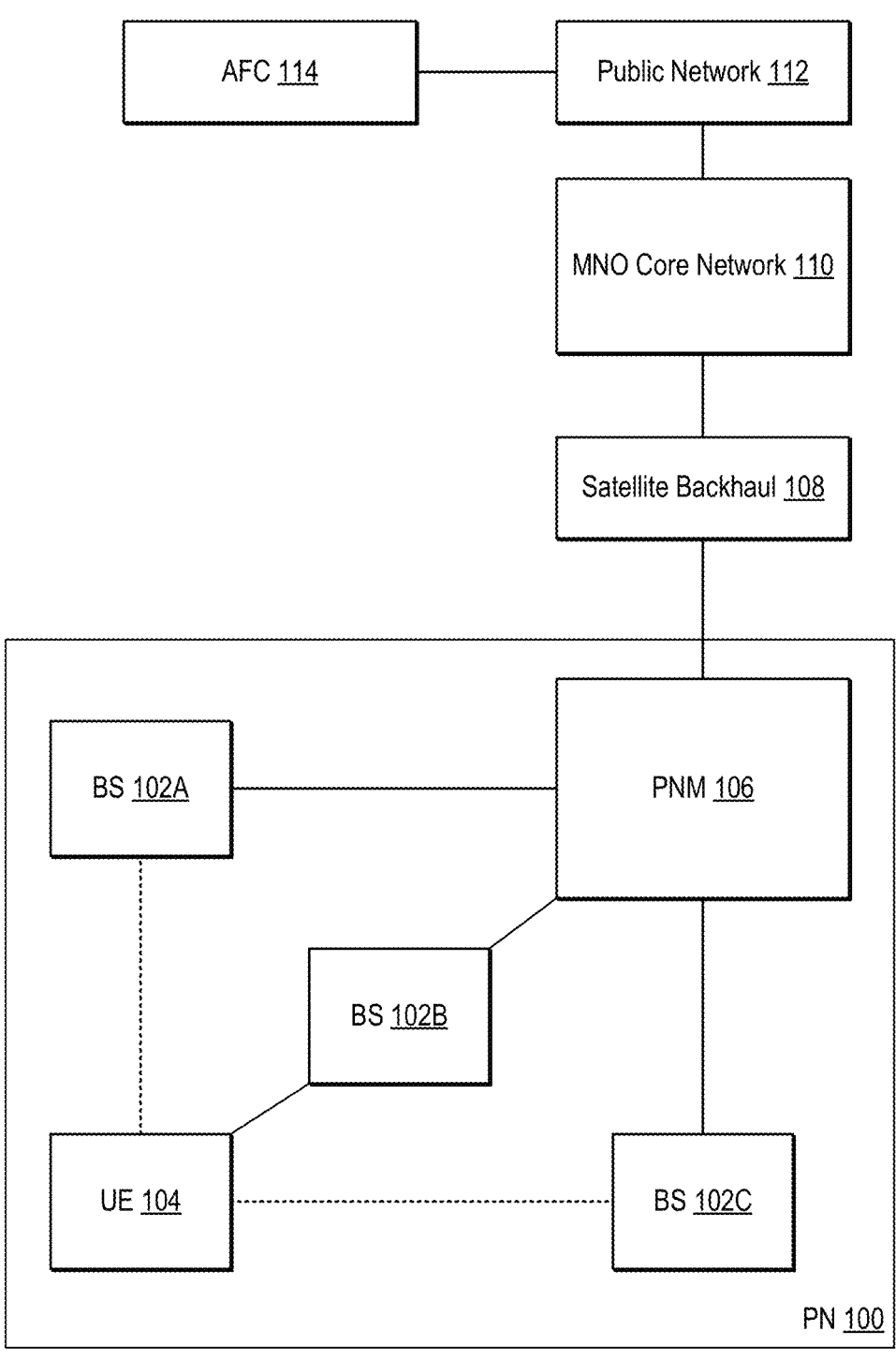
FIG. 1 is a block diagram of a system including a private network according to some of the example embodiments.

In general, current private networks are frequently deployed in fixed locations (e.g., corporate offices, hotels, stadiums, etc.). Such networks include a plurality of radio transmitters (e.g., base stations) distributed in a geographic region. These transmitters are then communicatively coupled to a larger core network operated, for example, by an MNO. The private network and core network are generally connected via high-speed fiber lines which provide connectivity for data and voice services.

Current implementations of private networks suffer from numerous technical limitations. First, private networks cannot be employed in non-stationary scenarios (e.g., onboard aircraft or ships) due to the difficulty of supporting high data rate backhaul and to limitations on licensed spectrum. Second, private networks cannot currently be deployed in remote or rural locations due to the lack of high-speed fiber connectivity, or high-speed wireless backhaul in such areas. Third, private networks cannot generally be used outside the United States without significant regulatory approval which may not be feasible given the operating parameters of the base stations. As such, there currently exists a need in the art for a more robust private network architecture that can support these, and other, use cases.

In some implementations, the techniques described herein relate to a private network that includes a base station and a private network manager. The private network manager may include a radio controller, channel manager, and a satellite gateway, among other components. The radio controller can identify a current location and identify permissible wireless frequencies based on the current location of the private network, private network manager, and/or base station. The channel manager scans the permissible wireless channels, identifies a subset of the permissible wireless channels within the permissible wireless frequencies, selects a radio profile based on the subset of the permissible wireless channels, and transmits the radio profile to the base station (via, in some scenarios, the radio controller). The gateway can receive and transmit data from a satellite backhaul.

In some implementations, the base station can be a standalone new radio unlicensed (NR-U) radio. In some implementations, the standalone NR-U radio operates at a power level below 30 dBm and in a frequency band selected from one of U-NII-5, U-NII-6, U-NII-7, and U-NII-8 spectrum bands, discussed further herein. In some implementations, the standalone NR-U radio operates at a power level greater than or equal to 30 dBm. In this case, the channel manager refines the permissible wireless frequencies based on a subset of channels allocated by a remote Automated Frequency Coordination (AFC) System. In some implementations, the base station, the radio controller, the channel manager, and the gateway are installed within a vehicle. In some implementations, the gateway is configured to receive and transmit data from a satellite backhaul. In some implementations, the channel manager is further configured to scan the permissible wireless channels, rank the permissible wireless channels, and select a highest-ranking contiguous subset of the permissible wireless channels as the subset of the permissible wireless channels.

In other implementations, the techniques described herein relate to a method and non-transitory computer-readable storage medium for tangibly storing computer program instructions for determining initial frequencies for a RAN based on a geographic position of a base station and a power level of the base station. The method scans a plurality of channels within the one or more initial frequencies to identify a set of available channels and ranks the set of available channels based on corresponding channel qualities. The method can further select a subset of channels from the set of available channels. Finally, the method can select or generate a radio profile using the subset of channels and transmit the radio profile to the base station, the radio profile causing the base station to operate on a channel in the subset of channels.

In some implementations, the method can identify the geographic position (e.g., latitude, longitude, and elevation) of the radio controller via a GPS and select the one or more initial frequencies based on the geographic position. In some implementations, selecting the one or more initial frequencies includes identifying an indoor or outdoor installation of the base station and a power mode of the base station.

In some implementations, the one or more initial frequencies are in the U-NII-5, U-NII-6, U-NII-7, and U-NII-8 spectrum bands. In some implementations, the base station includes a standard power radio, and the method includes refining the one or more initial frequencies based on a subset of spectrum bands permitted by a remote AFC system in order to protect possible local licensed incumbents. In some implementations, selecting the subset of channels from the set of available channels includes selecting the highest ranking subset of contiguous channels. In some implementations, the method includes receiving data from the base station and communicating data to a satellite backhaul via a satellite terminal.

FIG. 1 is a block diagram of a system including a private network according to some of the example embodiments.

In an implementation, private network (PN) 100 may include a PNM 106 communicatively coupled to one or more base station (BS) devices (e.g., BS 102A, BS 102B, BS 102C). A user equipment (UE 104) may communicate over an air interface with each BS. In the illustrated implementation, UE 104 is attached to BS 102B, however (as illustrated by dotted lines) may periodically attach to BS 102A or BS 102C. In some implementations, PN 100 may further include a localized cellular core network (in addition to MNO core network 110) to handle some or all voice or data services.

In some implementations, PN 100 can be deployed in various locations including, without limitation, rural or sparsely populated areas with no fiber connectivity; large body aircraft flying above 10,000 feet restricted to the 5.925-6.425 GHz band; large body aircraft for international flights restricted to the 5.925-6.425 GHz band; boats, ships, or other seafaring vessels in international waters; vehicle networks; and non-U.S. fixed or portable base station deployments. As will be discussed, these uses are enabled due in part to the use of unlicensed spectrum and configurable radios.

Each BS may include various components for communicating both over the air with UE 104 as well as with PNM 106. For example, each BS may include one or many antennas responsible for transmitting and receiving radio signals to/from the UE 104. A given BS may further include one or many transceivers to convert electrical signals into radio waves for transmission, and vice versa. A transceiver can further handle the encoding, decoding, modulation, and demodulation of signals passing through the BS. In some implementations, antennas and transceivers may comprise a "radio" of the BS. Any given BS may include various other components including, but not limited to, baseband units for signal processing, data compression, error correction, and encryption, radio frequency (RF) hardware (e.g., amplifiers, filters, and other components) for managing RF signaling, and network interfaces for communicating with PNM 106.

In some implementations, the radio portion of each BS may comprise a standalone NR-U (New Radio, unlicensed) radio. A standalone NR-U radio does not require a licensed anchor band. In general, a licensed anchor band refers to a specific frequency band that is allocated and licensed by regulatory authorities for wireless communication services. In the context of mobile networks, the anchor band is typically a primary frequency band used by a BS to provide cellular coverage and connectivity. However, the radio of the illustrated BS, when configured in standalone NR-U mode does not require such a band and operates solely in unlicensed spectrum, as per 3GPP standards. Use of standalone NR-U thus allows BS 102A, BS 102B, and BS 102C to operate anywhere in the continental U.S. and even overseas, without concerns on licensed spectrum rights. Further, as will be discussed, in some implementations, the radios may be configurable to operate in radio access technology (RAT) option 1 (NR-U only) which results in each BS be configured to support the entire 6 GHz band (from 5,925 GHz to 7,125 GHz), spanning the following U-NII bands:

U-NII-5: 5,925 GHz-6,425 GHz
U-NII-6: 6,425 GHz-6,525 GHz
U-NII-7: 6,525 GHz-6,875 GHz
U-NII-8: 6,875 GHz-7,125 GHz

In some implementations, the BS devices may comprise fixed BS devices. However, the disclosure is not limited as such. Indeed, portable, or otherwise non-stationary BS devices may be used. In some implementations, the PN 100 may include both stationary/fixed BS devices as well as portable BS devices, and the disclosure is not limited as such.

In some implementations, each BS (e.g., radio) can operate according to a radio profile. In general, a "radio profile" refers to a set of configurable parameters that define the behavior and characteristics of the radio transmission and reception by a radio of a BS. In some implementations, these parameters can be specific to the radio interface of the BS and can be adjusted to optimize performance, coverage, capacity, and other operational aspects. Any given radio profile can include supported frequency bands determine the range of frequencies that the base station can transmit and receive on as well as other parameters such as a transmit power level that can define the strength of the radio signals emitted by the BS, a modulation scheme (e.g., Quadrature Phase-Shift Keying, Quadrature Amplitude Modulation, etc.) that can determine how data is encoded onto the radio signals for transmission, a channel bandwidth that can set the width of the frequency spectrum allocated for each radio channel, error correction and coding schemes, and antenna configuration parameters (e.g., the number of antennas, antenna type, beamforming parameters, and antenna patterns). In some implementations, the radios of BS 102A, BS 102B, and BS 102C may be configurable according to such radio profiles. While not limited, the disclosure provides examples of radio profiles that modify (a) the frequencies and bands used; and (b) the power level used by a given radio. The following example radio profiles are used here:

TABLE 1

| Profile | Use | Frequencies Allowed | Effective Isotropic Radiated Power (EIRP) Limit |
|---|---|---|---|
| Radio Profile 1 | U.S. operation, low-power indoor | U-NII-5; U-NII-6 U-NII-7; U-NII-8 | 30 dBm |
| Radio Profile 2 | U.S. operation, "standard power" | U-NII-5 U-NII-7 | 36 dBm |
| Radio Profile 3 | Non-U.S. operation, "low power" and "standard power" | U-NII-5 | 30 to 36 dBm |

In Table 1, each radio profile (1, 2, and 3) includes a set of allowed frequencies (e.g., spectrum bands) and a maximum power level. Each radio of BS 102A, BS 102B, and BS 102C can be configured to adjust its operations based on these profiles. As indicated, a power level limited to an EIRP of 30 dBm is referred to as a "low power" radio since a radio below this level is not required (in the United States) to manage channel assignments using a remote AFC system. By contrast, radios operating at a maximum of 36 dBm EIRP are required to, connect to a remote AFC system, as will be discussed.

Figure 2:
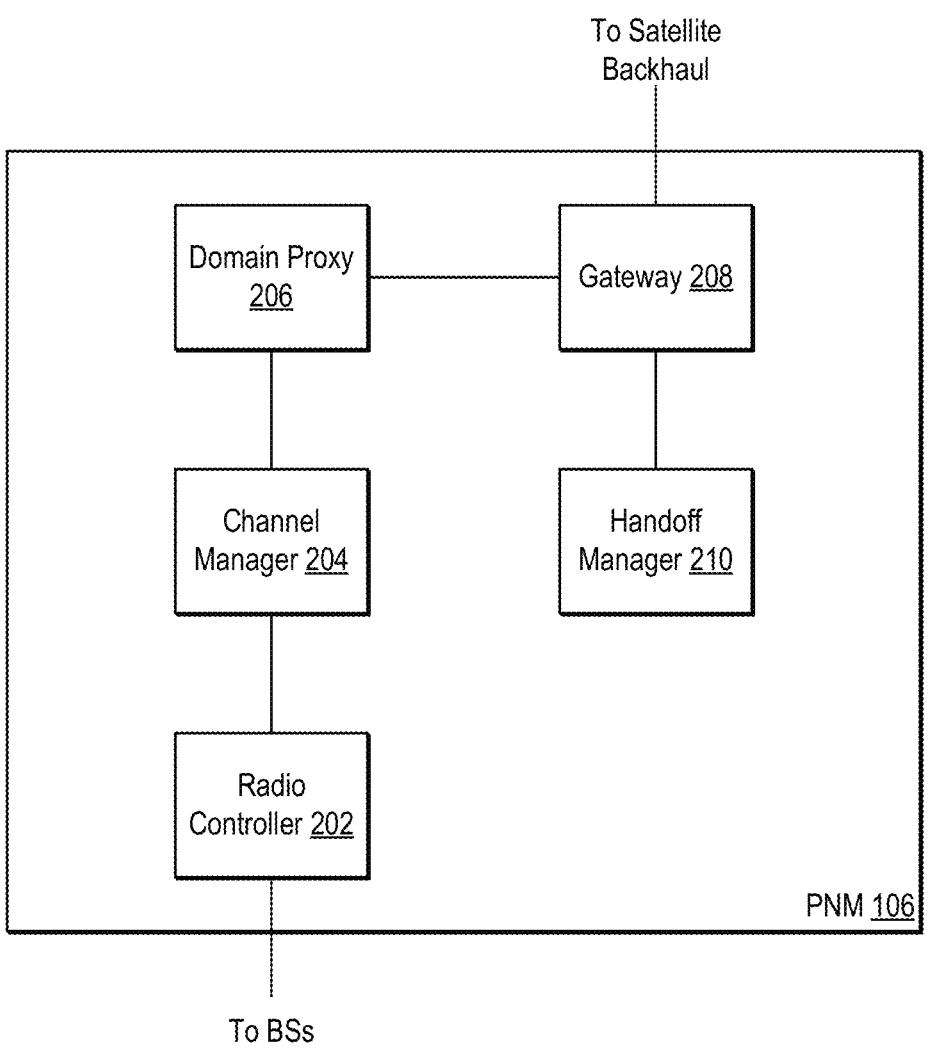
FIG. 2 is a block diagram illustrating a personal network manager (PNM) according to some of the example embodiments.

In an implementation, a PNM 106 communicates with the BS devices over an interface such as a wired interface or, in some cases, a wireless interface. PNM 106 can be configured to determine the appropriate radio profile to transmit to each BS (BS 102A, BS 102B, BS 102C) prior to establishing a RAN using BS 102A, BS 102B, BS 102C. Reference is now made to FIG. 2 for a further discussion of the PNM 106.

PNM 106 is also communicatively coupled to a satellite backhaul 108. In some implementations, PNM 106 can communicate with satellite backhaul 108 via a satellite ground terminal (not illustrated). Specific details of a satellite ground terminal are not limiting and any such terminal that can communicate with a satellite network for voice and/or data transmission may be used. In some implementations, the satellites in the satellite network may comprise non-geostationary satellite orbit (NGSO) satellites. In other implementations, a Geosynchronous (GEO) satellite may be suitable. The specific orbit of such satellites is not limiting a low-earth orbit (LEO), medium-earth orbit (MEO), or highly elliptical orbit (HEO) satellite networks, GEO, or a combination thereof, may be used. Further, no limit is placed on the frequency used for satellite backhaul and any reasonable frequency (e.g., Ku-band, Ka-band, V-band) may be used. In some implementations, use of NGSO can minimize latency in travel times of signals. However, the disclosure is not limited as such, and, in some implementations, a geostationary earth orbit (GEO) satellite network may be used if end-to-end latency is not critical.

PNM 106 can manage the satellite ground terminal to coordinate satellite handoffs and maintain a reliable communications channel with the satellite network. In some implementations, PNM 106 can enable cellular voice, data, and administrative transmissions to an MNO core network 110. The specific details of MNO core network 110 are not limiting and MNO core network 110 may comprise a 4G, 5G, or another similar cellular core network. In general, the MNO core network 110 can provide cellular voice communications with other UEs including UEs not located within PN 100. Further, MNO core network 110 can provide data communications with other UEs (including UE not located within PN 100) as well as other devices connected through a public network 112 (such as the internet). One example of such a device is AFC system 114. AFC system 114 may be a remote AFC system configured to oversees the frequency management for multiple devices or base stations. Specific details of AFC system are not provided herein and are generally known in the art.

FIG. 2 is a block diagram illustrating a PNM according to some of the example embodiments.

In an implementation, the PNM 106 includes a radio controller 202, channel manager 204, domain proxy 206, satellite gateway 208, and a handoff manager 210. As illustrated, PNM 106 can communicate with BS devices via radio controller 202 and via external devices (e.g., MNO core network 110, AFC system 114) via satellite gateway 208. Details of those northbound (i.e., to satellite backhaul 108) and southbound (i.e., to BS devices such as BS 102A, BS 102B, BS 102C) interfaces and data transmitted thereon are not repeated herein. In some implementations, some, or all of radio controller 202, channel manager 204, domain proxy 206, satellite gateway 208, and a handoff manager 210 can be implemented as separate hardware devices. However, in other implementations, some, or all of radio controller 202, channel manager 204, domain proxy 206, satellite gateway 208, and a handoff manager 210 can be implemented as a single hardware element. For example, some or all of radio controller 202, channel manager 204, domain proxy 206, satellite gateway 208, and a handoff manager 210 can be implemented on a general-purpose computing device such as that depicted in FIG. 6. Further, the functions described herein an in FIGS. 3 through 5 may be implemented as virtualized functions or network functions.

In an implementation, radio controller 202 is configured to control the parameters and profiles of BS devices in a PN (e.g., PN 100). In some implementations, radio controller 202 is configured to determine the location of itself, the PN, and/or the BS devices via a Global Positioning System (GPS) receiver, GNSS (Global Navigation Satellite System), IEEE Precise Time Protocol (PTP), or other suitable timing reference and position protocol. In some implementations, the GPS receiver is separate from the satellite ground terminal and can be configured to determine the latitude, longitude, and (optionally) the elevation of radio controller 202. Based on this location, radio controller 202 can classify the territory it is in (e.g., United States, international waters, other countries, etc.). In some implementations, radio controller 202 can further control the parameters and settings of BS devices by transmitting radio profiles to the BS devices by, for example, assigning channels to the BS devices and power levels for individual channels in the BS.

In an implementation, channel manager 204 is configured to scan frequency bands, based on spectrum restrictions, to identify clean channels within the frequency bands that are not interfered with by other wireless transmissions such as wireless fidelity (Wi-Fi) transmissions in the 6 GHz band. Channel manager 204 can determine which frequency bands to scan based on the location reported by radio controller 202 as well as by authorized frequencies transmitted by a remote AFC system. Channel manager 204 can report the final available frequencies and/or channels to radio controller 202 which can then assign radio profiles to the individual BS devices.

In an implementation, domain proxy 206 can be configured to aggregate messages from BS devices and transfer bulk data to remote devices via the satellite gateway 208, reducing satellite link bandwidth. In an implementation, domain proxy 206 can aggregate of all the relevant parameters and messages for BS devices in the PN and transmit such aggregate parameters to a remote AFC system (as well as receive responsive data from the remote AFC system).

In an implementation, satellite gateway 208 can be configured to implement security gateway functionality to establish secure connections to/from a satellite backhaul. Satellite gateway 208 can further interface with a satellite ground terminal (not illustrated) to communicate with a satellite backhaul. Satellite gateway 208 can further obtain NGSO state information relevant to facilitate handoffs and encapsulate data in a format suitable for satellite backhaul. Relatedly, handoff manager 210 can supports handoff operations to other NGSO satellites, such that when one NGSO moves out of the field of view and satellite signal level falls below a pre-determined threshold a handover is initiated.

Figure 3:
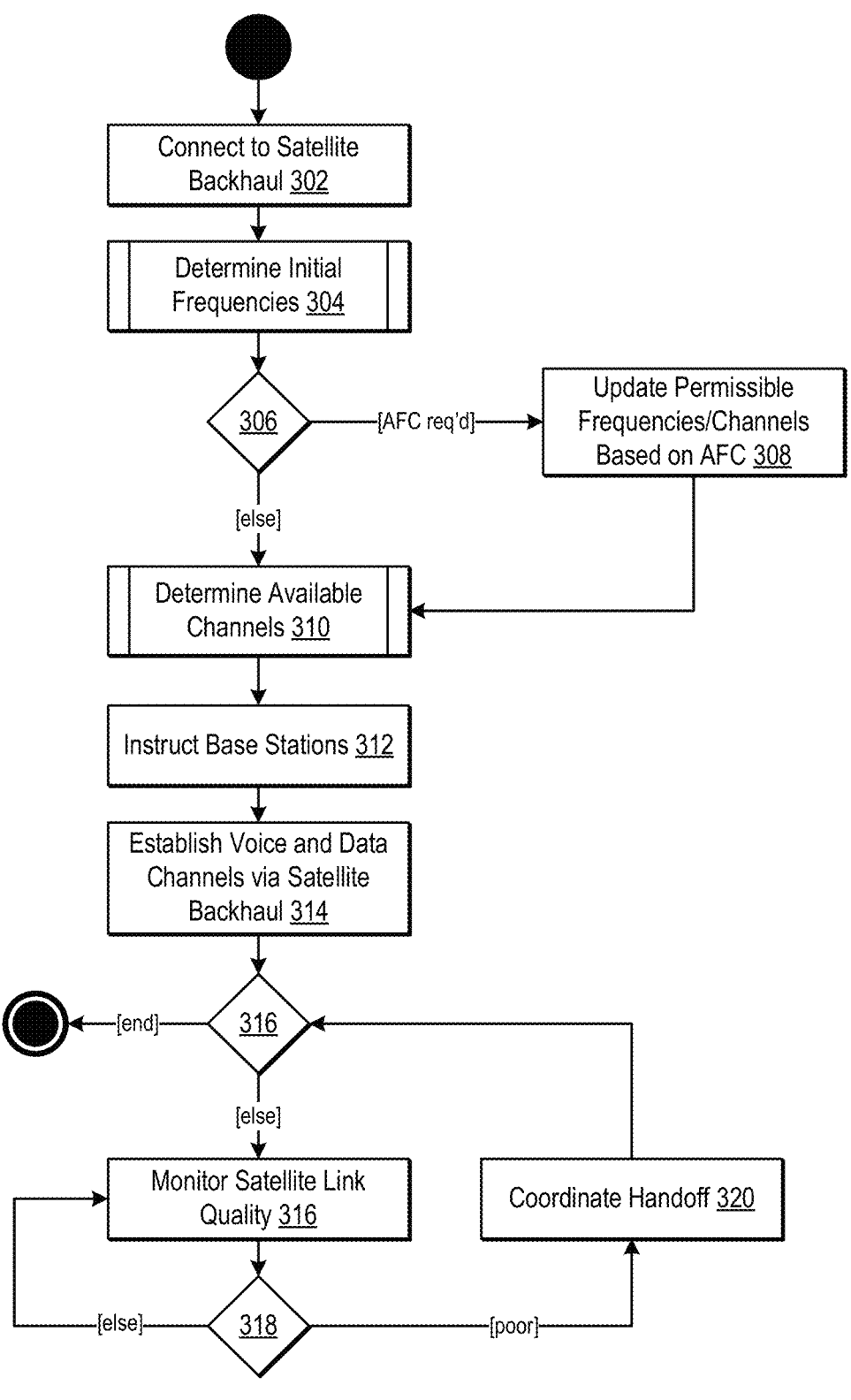
FIG. 3 is a flow diagram illustrating a method for initializing and operating a private network according to some of the example embodiments.
Figure 4:
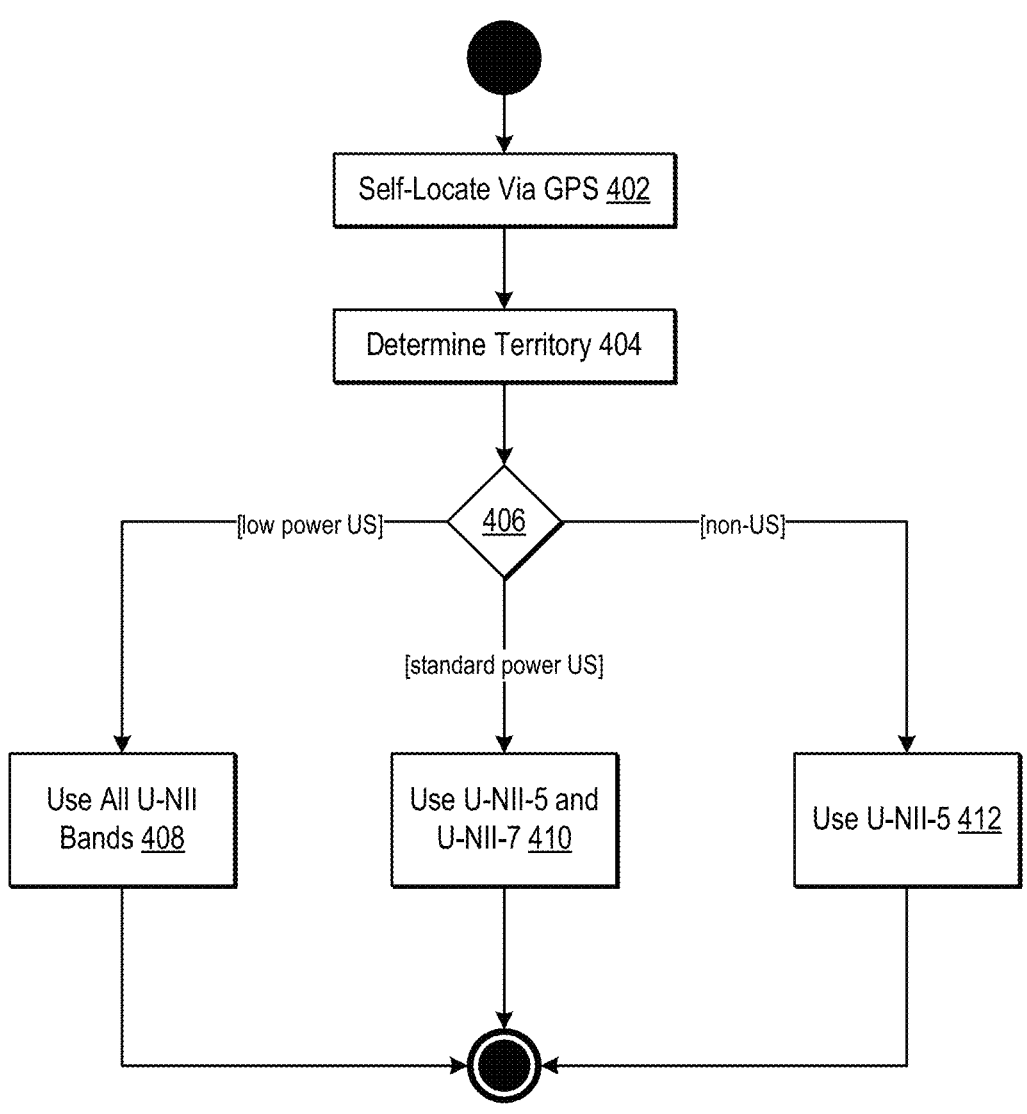
FIG. 4 is a flow diagram illustrating a method for determining a set of initial frequencies for a RAN according to some of the example embodiments.
Figure 5:
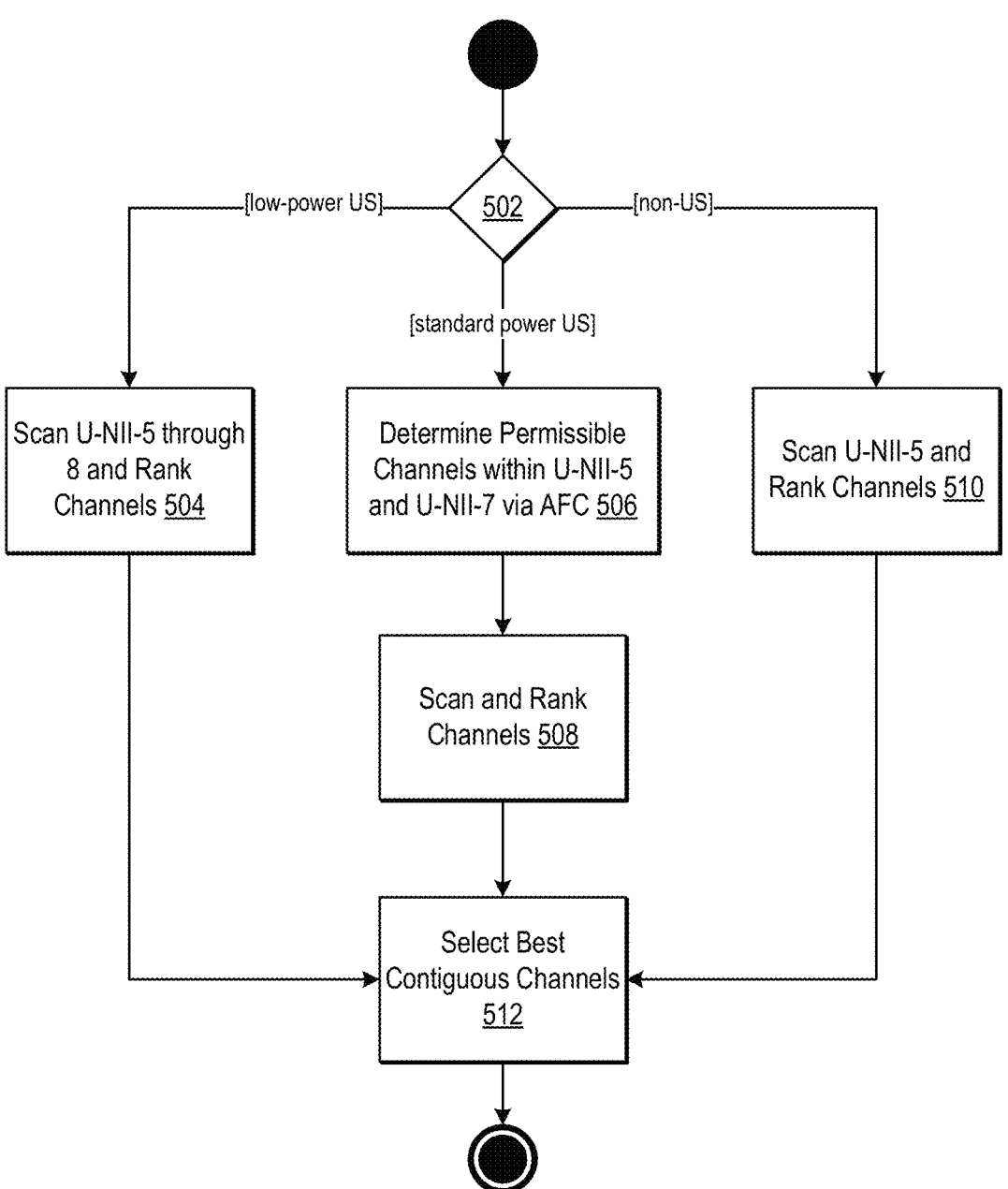
FIG. 5 is a flow diagram illustrating a method for determining a set of available channels for a RAN according to some of the example embodiments.

Specific functional details of the components of PNM 106 are described more fully in connection with FIGS. 3 through 5 and the associated discussions are incorporated herein in their entirety.

FIG. 3 is a flow diagram illustrating a method for initializing and operating a private network according to some of the example embodiments. In some implementations, the method of FIG. 3 may be executed by a PNM such as that discussed in the foregoing figures.

In step 302, the method can include connecting to a satellite backhaul.

In some implementations, a satellite gateway of a PNM can communicate with a satellite ground terminal to initiate a connection to a satellite. As discussed above, the satellite can be part of a NGSO or GEO satellite constellation and the satellite ground terminal may communicate with the satellite constellation via a high frequency microwave interface (e.g., Ku-band, Ka-band, V-band, etc.). In some implementations, the satellite gateway and the ground terminal can authenticate the PNM to the satellite network using any known means to authenticate to a satellite network. Upon authenticating and performing any initial handshaking, the satellite ground terminal may begin transmitting and receiving data with other devices via the satellite network.

In step 304, the method can include determining a set of initial frequencies.

In some implementations, prior to step 304, the radios of BS devices of the PN may be awaiting configuration or parameters to operate. Specifically, the BS devices may be configured to await a radio profile before enabling their radios and providing a RAN for any UEs authorized to use the PN. In some implementations, a radio controller can be configured to determine the set of initial frequencies. Details of this process are described more fully in FIG. 4 and are not repeated herein. At a high level, the radio controller first determines its location and based on this location (and other parameters such as whether the PN is configured for indoor or outdoor operation) and radio profile, and can determine the initial set of frequencies or spectrum bands. In general, these spectrum bands may correspond to U-NII spectrum bands although the disclosure is not specifically limited to specific frequency ranges. In general, however, the initial bands (and ultimate bands) will comprise unlicensed spectrum bands.

In step 306, the method can include determining if AFC is required for one or more base station. If so, the method proceeds to step 308 where it updates the permissible frequencies based on the permissible frequencies provided by the AFC system.

AFC may be required based on the operating power of the radios of the base stations. In some implementations, the base stations are homogenous, operating at the same or similar power levels. In other implementations, base stations may operate at independent power levels. In general, if any base station radio is operating at over 30 dBm, AFC is required. In some implementations, AFC can be implemented within the PNM. However, in other embodiments, a remote AFC system can be used. In some implementations, the remote AFC system can comprise a cloud-based AFC system. In some implementations, a "cloud" AFC comprises a remote AFC that utilize centralized servers and internet connectivity for coordination and management of frequency assignments. If a remote AFC system is used, the method can include providing a location and parameters of the base station radios to the remote AFC system and receiving a list of permissible frequencies or spectrum bands from the remote AFC system. From this list, the method can include filtering or refining the initial set of frequencies based on the permissible bands received from the remote AFC system. In some implementations, the permissible bands from the AFC system may be a subset of the initial frequencies. In this case, the method can include using the AFC system-provided frequencies or spectrum bands. In other scenarios, the AFC system-provided bands may overlap with the initial frequencies. In this scenario, the method can include using the intersection. In yet another scenario, the AFC system-provided bands may not overlap at all with the initial frequencies. In such a scenario the method may end if the only permissible bands received from the AFC system are not capable of being used within the constraints provided herein. Alternatively, the method may use the AFC system-provided bands if they are capable of being used in conjunction with the following constraints. Notably, step 306 and step 308 may be bypassed if the radios of the base stations are operating in "low power" mode (e.g., less than approximately 30 dBm).

In step 310, the method can include determining a list of available channels. In some implementations, step 310 can be executed by a channel manager of the PNM. Details of step 310 are provided in the description of FIG. 5 and are not repeated herein. In general, however, the channel manager can scan all channels of the permissible frequencies or spectrum bands. In some implementations, the channel manager can identify this set of channels by selecting channels permissible by an AFC system (if implemented), that are orthogonal to competing signals (e.g., Wi-Fi), and optionally based on measured properties of the channels. The channel manager can rank the channels based on the properties and select the set of the best contiguous channels (e.g., 8, 16, or 32 channels) for use by the base stations. The channel manager can generate or select a radio profile using these channels or can provide the channels to the radio controller which can generate or select the radio profile.

In step 312, the method can include instructing the base stations. In some implementations, the radio controller can transmit the generated or selected radio profile to each base station. In response, the base stations can begin to transmit and receive data using the selected wireless channels and thus operate a RAN within the PN.

In step 314, the method can include establishing voice and data connections with an MNO core network via the satellite backhaul. In some implementations, step 314 can be performed earlier in the process and generally entails the private network performing a network attachment to the MNO core network by authenticating and attaching itself to the MNO core network via the satellite backhaul. After PN attachment, individual UEs may authenticate to the MNO core network via the satellite backhaul, thus providing voice and data services to UEs attached to the base stations of the PN.

In step 316, the method can include monitoring the quality of the satellite uplink and downlinks. In some implementations, a handoff manager can be responsible for continuously monitoring the link quality. The handoff manager can monitor various measurable properties of the satellite link such as the signal strength, signal-to-noise ratio (SNR), bit error rate (BER), latency, jitter, throughput, availability, and link budget of the satellite link.

In step 318, the method can include determining if the satellite link quality meets or exceeds a required quality. In some implementations, this required quality can be defined by a quality-of-service setting of the PN (and optionally managed by the MNO). If so, the method returns to step 316, where it continues to monitor the satellite link quality.

In step 320, the method has determining that the satellite link quality is below the quality threshold and coordinates a handoff. In some embodiments, this handoff can be a hard satellite handoff. In satellite communications, a "hard" satellite handoff refers to a handover process where the connection between a satellite ground terminal and a satellite is abruptly terminated on one satellite and established on another satellite. This handoff occurs when the satellite ground terminal needs to establish a connection with a new satellite to maintain continuous connectivity. In some implementations, upon losing a line of sight or determining that the link is of poor quality, the handoff manager can select a new target satellite based on predefined criteria, which may include factors like signal strength, signal quality, availability, or network policies.

Alternatively, the handoff manager may employ a soft handoff process also known as a seamless handover or seamless beam switching. During a soft handoff, the satellite ground terminal maintains an active connection with both the current satellite beam and the target satellite beam simultaneously. This allows for a seamless transition without any noticeable interruption in service. During this process, the satellite ground terminal may hold two satellite connections then, when one link degrades as detected in step 318, the method can assess the other link and handover to the other link that has already been established, repeating the process for other handoffs.

FIG. 4 is a flow diagram illustrating a method for determining a set of initial frequencies for a RAN according to some of the example embodiments. In some implementations, the method of FIG. 4 may be executed by a radio controller of a PNM.

In step 402, the method can include self-locating via GPS. In some implementations, the radio controller or another device within the PNM can include a GPS receiver and be capable of determining its position. In some implementations, the geographic position can include a latitude and longitude. In some implementations, the geographic position can also include an elevation. In some implementations, step 402 can also include determining whether the PN is an indoor or outdoor PN based on a preconfigured setting.

In step 404, the method can include determining a territory associated with the self-located geographic position. In some implementations, the method can include determining, primarily, whether the PNM is within the United States or outside the United States. Other territorial decisions can be made such as identifying the country, region, state, or other administrative definition of a territory. In some implementations, the method can use a set of geofences to identify the territory from a latitude and longitude.

In step 406, the method can include determining which initial frequencies or spectrum bands to use based on the determined geographic position, the power level of the radios, and other factors. The illustrated method depicts three options; however, the disclosure is not limited as such and generally the method may select frequencies based on any permutation of factors (e.g., geographic position, indoor/outdoor, vehicle type, etc.).

In step 408, the method can include using all permissible U-NII bands when the radios are low power, and the determined territory is within the continental United States (CONUS). As used herein, all permissible U-NII bands refers to U-NII bands U-NII-5 through U-NII-8. In some implementations, the method may further include executing step 408 only when the base stations are indoor base stations, although in some implementations, use of low power radios may be deemed an implied indication of indoor use. As such, in step 408, the method may determine the initial set of frequencies to be all frequencies between 5,925 GHz and 7,125 GHz.

In step 410, the method can include using U-NII-5 and U-NII-7 bands when the radios are standard power, and the determined territory is within the CONUS. In some implementations, in this determination, the method may further determine that the base stations are either indoor or outdoor and are operating above 30 dBm (standard power) and thus may only utilize U-NII bands U-NII-5 and U-NII-7. As such, in step 410, the method may determine the initial set of frequencies to be all frequencies between 5,925 GHz and 6,425 GHz and between 6,525 GHz and 6,875 GHz.

In step 412, the method can include using U-NII-5 band when the determined territory is outside the CONUS. In this scenario, the determination of a geographic position outside of CONUS may result in the selection of only U-NII-5 (5,925 GHz-6,425 GHz) as the initial set of frequencies to use. In some implementations, this determination may be made regardless of the radio power since U-NII-5 is accepted globally for unlicensed operations.

After selecting the initial U-NII bands or frequencies, the method can provide these frequencies or bands to a channel manager for further refinement and channel selection. As discussed in FIG. 3, the method can filter these initial frequencies or bands based on AFC system requirements (discussed above) and then can select channels within the frequencies for use by base stations (discussed above and in more detail below).

FIG. 5 is a flow diagram illustrating a method for determining a set of available channels for a RAN according to some of the example embodiments. In some implementations, the method of FIG. 5 may be executed by a channel manager of a PNM.

In step 502, the method can include determining the configuration of the base stations and PNM. This determination can be done in the same way as described in step 406, which is not repeated herein but incorporated in its entirety. As in step 406, the method illustrates three alternatives although the disclosure is not only limited to those.

When the base stations are within the CONUS and are low-power radios, the method proceeds to step 504. In this step 504, the method can include scanning all channels within U-NII bands U-NII-5 through U-NII-8. In some implementations, the channel width may be fixed (e.g., 20 MHz) and thus the method can scan each channel (e.g., 60 channels) sequentially. During scanning, the method can obtain various metrics for each channel, including, but not limited to channel occupancy, noise level, SNR, interference level, packet collision rate, BER, channel utilization, etc. In some implementations, a Wi-Fi channelization routine may be used to scan channels. In some implementations, the channel width may be adjustable (e.g., 40 MHz, 80 MHz, 160 MHz) and is not limited to 20 MHz. After obtaining these metrics, the method can include ranking each channel based on the underlying metrics. No limit is placed on how these metrics can be used to rank channels. For example, pre-determined weights can be assigned to each type of measurement and the measurements can then be summed and then normalized to obtain a single metric for each channel for ranking.

When the base stations are within the CONUS and are standard power radios, the method proceeds to step 506. Here, since the radios are standard power, the method can include filtering the initial set of frequencies based on AFC system-permissible frequencies, as described above. Thus, while the method begins with U-NII-5 and U-NII-7, the AFC-permissible frequencies/channels may be used to refine the list of potential frequencies. Details of using AFC systems are provided previously and not repeated herein. After refining the list of frequencies, the method scans and ranks channels within this refined frequency list in step 508. In some implementations, this ranking can be performed based on metrics for each channel, including, but not limited to channel occupancy, noise level, SNR, interference level, packet collision rate, BER, channel utilization, etc. This process can be performed as discussed in step 504 and that discussion is not repeated herein.

When the base stations are outside the CONUS, the method proceeds to step 510. In step 510, the method can scan the channels of the U-NII-5 band. In some implementations, the U-NII-6 band may also be included. This process can be performed as discussed in step 504 and that discussion is not repeated herein.

The ultimate result of step 504, step 508, and step 510 is a list of channels, each channel including ranking. In step 512, the method concludes by selecting the best set of contiguous channels using the rankings. In some implementations, the channels need not be contiguous, however doing so can improve the quality of the RAN. As one example, the method can use a fixed number of channels (e.g., 8, 16, or 32) and iteratively slide a window over the list of channels, computing the ranking of the window of channels at each interval, thus identifying the best average set of contiguous channels. Other channelization techniques may also be used to identify the best set of contiguous channels. Ultimately, the best set of contiguous channels may be provided either to the base stations directly or to the radio controller for transmission to the base stations as described previously.

Figure 6:
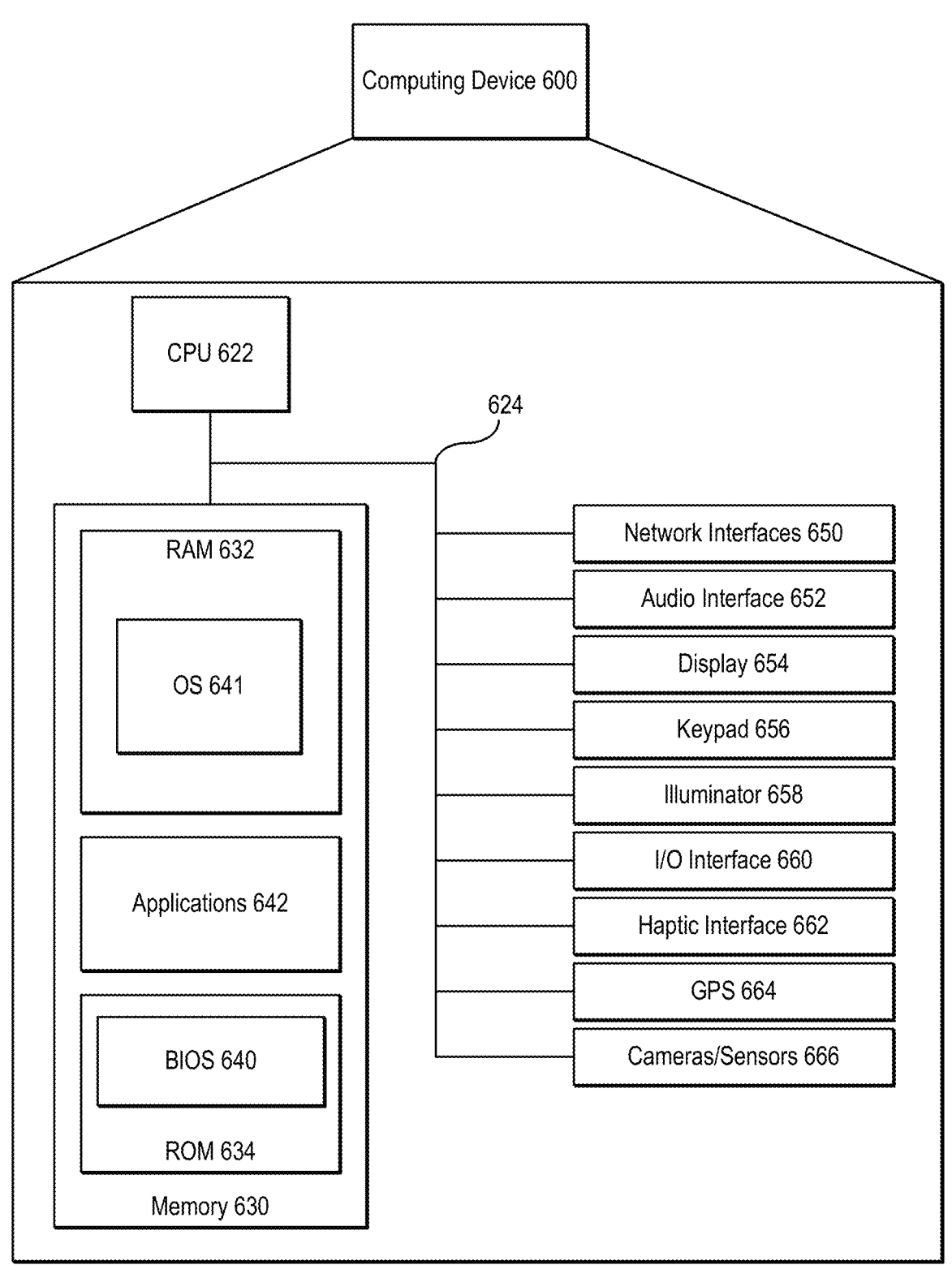
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device 600 can include more or fewer components than those shown in FIG. 6 depending on the deployment or usage of the computing device 600. Further, the computing device 600 may include multiple components of a same type (e.g., multiple network interfaces). For example, a server computing device, such as a rack-mounted server, may not include an audio interface 652, display 654, keypad 656, illuminator 658, haptic interface 662, GPS receiver 664, or sensor 666 (e.g., cameras or other optical, thermal, or electromagnetic sensors). As another example, a routing device may include multiple network interfaces (e.g., WAN interface and LAN interface). Some devices can include additional components not shown, such as graphics processing unit (GPU) devices, cryptographic co-processors, artificial intelligence (AI) accelerators, or other peripheral devices.

As shown in the figure, computing device 600 includes a central processing unit (CPU 622) in communication with a mass memory 630 via a bus 624. The computing device 600 also includes a network interface 650, an audio interface 652, a display 654, a keypad 656, an illuminator 658, an input/output interface 660, a haptic interface 662, a GPS receiver 664 and a sensor 666. The positioning of the sensor 666 on the computing device 600 can change per computing device 600 model, per computing device 600 capabilities, and the like, or some combination thereof.

In some embodiments, the CPU 622 can comprise a general-purpose CPU. The CPU 622 can comprise a single-core or multiple-core CPU. The CPU 622 can comprise a system-on-a-chip (SoC) or a similar embedded system. In some embodiments, a GPU can be used in place of, or in combination with, a CPU 622. Mass memory 630 can comprise a dynamic random-access memory (DRAM) device, a static random-access memory device (SRAM), or a Flash (e.g., NAND Flash) memory device. In some embodiments, mass memory 630 can comprise a combination of such memory types. In one embodiment, the bus 624 can comprise a Peripheral Component Interconnect Express (PCIe) bus. In some embodiments, the bus 624 can comprise multiple buses instead of a single bus.

Mass memory 630 illustrates another example of computer storage media for the storage of information such as computer-readable instructions, data structures, program modules, or other data. Mass memory 630 stores a basic input/output system (BIOS 640) for controlling the low-level operation of the computing device 600. In the illustrated embodiment, the BIOS 640 may be stored in a read-only memory (ROM) such as ROM 634. The mass memory also stores an operating system 641 for controlling the operation of the computing device 600.

Applications 642 can include computer-executable instructions which, when executed by the computing device 600, perform any of the methods (or portions of the methods) described previously in the description of the preceding figures. In some embodiments, the software or programs implementing the method embodiments can be read from a hard disk drive (not illustrated) and temporarily stored in RAM 632 by CPU 622. CPU 622 can then read the software or data from RAM 632, process them, and store them in RAM 632 again.

The computing device 600 can optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 can be coupled to a speaker and microphone (not shown) to enable telecommunication with others or generate an audio acknowledgment for some action. Display 654 can be a liquid crystal display (LCD), gas plasma, light-emitting diode (LED), or any other type of display used with a computing device. Display 654 can also include a touch-sensitive screen arranged to receive input from an object such as a stylus or a digit from a human hand.

Keypad 656 can comprise any input device arranged to receive input from a user. Illuminator 658 can provide a status indication or provide light.

The computing device 600 also comprises an input/output interface 660 for communicating with external devices, using communication technologies, such as USB, infrared, Bluetooth®, or the like. The haptic interface 662 provides tactile feedback to a user of the client device.

The GPS receiver 664 can determine the physical coordinates of the computing device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 can communicate through other components, providing other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

We claim:

1. A system comprising:
a base station;

a radio controller communicatively coupled to the base station and configured to identify a current location of the radio controller and identify permissible wireless frequencies based on the current location;

a channel manager communicatively coupled to the radio controller configured to scan the permissible wireless channels, identify a subset of the permissible wireless channels within the permissible wireless frequencies, select a radio profile based on the subset of the permissible wireless channels, and transmit the radio profile to the base station; and a satellite gateway communicatively coupled to the base station, the gateway configured to receive and transmit data from a satellite backhaul.

2. The system of claim 1, wherein the base station comprises a standalone NR-U radio.

3. The system of claim 2, wherein the standalone NR-U radio operates at a power level below 30 dBm and wherein the standalone NR-U radio operates in a frequency band selected from one of U-NII-5, U-NII-6, U-NII-7, and U-NII-8 spectrum bands.

4. The system of claim 2, wherein the standalone NR-U radio operates at a power level greater than or equal to 30 dBm and wherein the channel manager refines the permissible wireless frequencies based on a subset of spectrum bands and allowable channels communicated to the channel manager by a remote Automated Frequency Coordination (AFC) System.

5. The system of claim 1, wherein the base station, the radio controller, the channel manager, and the gateway are installed within a vehicle.

6. The system of claim 1, wherein the channel manager is further configured to scan the permissible wireless channels, rank the permissible wireless channels, and select a highest-ranking subset of the permissible wireless channels as the subset of the permissible wireless channels.

7. The system of claim 6, further comprising ranking the permissible wireless channels based on one or more of channel occupancy, noise level, signal-to-noise ratio (SNR), interference level, packet collision rate, bit error rate (BER), or channel utilization, for each of the permissible wireless channels.

8. The system of claim 6, wherein the highest-ranking subset of the permissible wireless channels comprises the highest-ranking subset of contiguous channels.

9. A method comprising:
determining, via a radio controller, one or more initial frequencies for a radio access network (RAN) based on a geographic position of the radio controller and a power level of a base station in the RAN;

scanning, by a channel manager, a plurality of channels within the one or more initial frequencies to identify a set of available channels;

ranking, by the channel manager, the set of available channels based on corresponding channel qualities;

selecting, by the channel manager, a subset of channels from the set of available channels;

generating, by the channel manager, a radio profile using the subset of channels; and transmitting, via the radio controller, the radio profile to the base station, the radio profile causing the base station to operate on a channel in the subset of channels.

10. The method of claim 9, wherein determining the one or more initial frequencies comprises:
identifying, by the radio controller, the geographic position of the radio controller, the geographic position comprising a latitude, longitude, and elevation determined via one of a Global Positioning System (GPS) receiver, GNSS (Global Navigation Satellite Systems) receiver, or IEEE Precise Time Protocol (PTP) transmission; and selecting, by the radio controller, the one or more initial frequencies based on the geographic position.

11. The method of claim 9, wherein selecting the one or more initial frequencies further includes identifying an indoor or outdoor installation of the base station and a power mode of the base station.

12. The method of claim 9, wherein the one or more initial frequencies are selected from a group consisting of frequencies within U-NII-5, U-NII-6, U-NII-7, and U-NII-8 spectrum bands.

13. The method of claim 9, wherein the base station includes a standard power radio and wherein the method further includes refining the one or more initial frequencies based on a subset of spectrum bands and allowable channels communicated to the channel manager by a remote Automated Frequency Control (AFC).

14. The method of claim 9, wherein selecting the subset of channels from the set of available channels comprises selecting a highest ranking subset of channels.

15. A non-transitory computer-readable storage medium for tangibly storing computer program instructions capable of being executed by a computer processor, the computer program instructions defining steps of:

determining, via a radio controller, one or more initial frequencies for a radio access network (RAN) based on a geographic position of the radio controller and a power level of a base station in the RAN;

scanning, by a channel manager, a plurality of channels within the one or more initial frequencies to identify a set of available channels;

ranking, by the channel manager, the set of available channels based on corresponding channel qualities;

selecting, by the channel manager, a subset of channels from the set of available channels;

generating, by the channel manager, a radio profile using the subset of channels; and transmitting, via the radio controller, the radio profile to the base station, the radio profile causing the base station to operate on a channel in the subset of channels.

16. The non-transitory computer-readable storage medium of claim 15, wherein determining the one or more initial frequencies comprises:

identifying, by the radio controller, the geographic position of the radio controller, the geographic position comprising a latitude, longitude, and elevation determined via a Global Positioning System (GPS) receiver, GNSS (Global Navigation Satellite Systems) receiver, or IEEE Precise Time Protocol (PTP) transmission; and selecting, by the radio controller, the one or more initial frequencies based on the geographic position.

17. The non-transitory computer-readable storage medium of claim 15, wherein selecting the one or more initial frequencies further includes identifying an indoor or outdoor installation of the base station and a power mode of the base station.

18. The non-transitory computer-readable storage medium of claim 15, wherein the one or more initial frequencies are selected from a group consisting of frequencies within U-NII-5, U-NII-6, U-NII-7, and U-NII-8 spectrum bands.

19. The non-transitory computer-readable storage medium of claim 15, wherein the base station includes a standard power radio and wherein the steps further include refining the one or more initial frequencies based on a subset of spectrum bands and allowable channels communicated to a channel manager communicated to the channel manager by a remote Automated Frequency Control (AFC).

20. The non-transitory computer-readable storage medium of claim 15, wherein selecting the subset of channels from the set of available channels comprises selecting a highest ranking subset of contiguous channels.

* * * * *